US008601356B2

(12) United States Patent
Langenbach et al.

(10) Patent No.: US 8,601,356 B2
(45) Date of Patent: Dec. 3, 2013

(54) METHOD AND CIRCUIT FOR BER ESTIMATION

(75) Inventors: Stefan Langenbach, Nuremberg (DE); Nebojsa Stojanovic, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 13/156,563

(22) Filed: Jun. 9, 2011

(65) Prior Publication Data

US 2011/0314358 A1 Dec. 22, 2011

(30) Foreign Application Priority Data

Jun. 18, 2010 (EP) .................................... 10166454

(51) Int. Cl.
*H03M 13/03* (2006.01)
*H04L 5/12* (2006.01)
*H04L 23/02* (2006.01)
*H04L 27/06* (2006.01)
*H03D 1/00* (2006.01)

(52) U.S. Cl.
USPC ............ 714/796; 714/794; 375/262; 375/341

(58) Field of Classification Search
None
See application file for complete search history.

(56) References Cited

U.S. PATENT DOCUMENTS

| 6,735,724 | B1 | 5/2004 | McClellan |
| 7,012,974 | B1 | 3/2006 | Liu et al. |
| 7,080,313 | B2 * | 7/2006 | Akiyama et al. ............... 714/794 |
| 7,460,451 | B2 * | 12/2008 | Baba ............................ 369/47.28 |
| 7,664,208 | B2 * | 2/2010 | Shiraishi ........................ 375/341 |
| 2003/0135812 | A1 | 7/2003 | Akiyama et al. |
| 2007/0014385 | A1 * | 1/2007 | Shiraishi ........................ 375/341 |
| 2010/0214895 | A1 * | 8/2010 | Miyashita et al. .......... 369/53.31 |

FOREIGN PATENT DOCUMENTS

| EP | 1383246 A2 | 1/2004 |
| EP | 1443697 A1 | 8/2004 |

OTHER PUBLICATIONS

Search Report for Counterpart European Patent Application No. 10166454.8.
International Search Report and Written Opinion in counterpart International Application No. PCT/US2011/039709, mailed Aug. 2, 2011.

* cited by examiner

*Primary Examiner* — Guerrier Merant
(74) *Attorney, Agent, or Firm* — Edell, Shapiro & Finnan, LLC

(57) ABSTRACT

This invention relates to a method and a circuit for estimating the bit error rate in a data transmission system. Symbols are detected (u) by a maximum likelihood detector (1), which provides path metrics of the decoded path and the best competitor at predetermined symbol positions. Absolute path metric differences (2) are calculated between the decoded path and the best competitor at said predetermined symbol positions. Events (5) are counted when an absolute path metric difference (2) is equal to one of a set of difference values. The bit error rate is estimated based on the number of counted (4) events (5). The invention further comprises a method and a circuit in which a function is applied onto said absolute path metric difference. The function maps quantized logarithms of probabilities to probabilities.

14 Claims, 8 Drawing Sheets

| $P_q$ | $p$ | $P_q$ | $p$ |
|---|---|---|---|
| 0 | 1.0000000 | 8 | 0.0118477 |
| 1 | 0.5743866 | 9 | 0.0068052 |
| 2 | 0.3299200 | 10 | 0.0039088 |
| 3 | 0.1895016 | 11 | 0.0022452 |
| 4 | 0.1088472 | 12 | 0.0012896 |
| 5 | 0.0625204 | 13 | 0.0007407 |
| 6 | 0.0359109 | 14 | 0.0004255 |
| 7 | 0.0206267 | 15 | 0.0002444 |

Fig. 7

METHOD AND CIRCUIT FOR BER ESTIMATION

This application claims foreign priority under 35 U.S.C. §119(a)-(d) to Application No. EP 10166454.8, filed on Jun. 18, 2010, entitled "Method and Circuit for BER Estimation," the entire contents of which is hereby incorporated by reference.

The present disclosure pertains to a method and circuit for bit error estimation (BER) in the context of maximum likelihood detectors based on path metrics differences.

BACKGROUND

An important consideration in the design of any communication system is the ability to assess the performance of the system while it is in operation. In digital communication systems, the ultimate criterion of performance of a data transmission link is the probability of error, often expressed in terms of the BER. As an element of an adaptive communication system BER estimation can be used to optimize receiver performance by adaptive changes of receiver parameters. In "Techniques for estimating the bit error rate in the simulation of digital communication systems" by M. C. Jeruchim, IEEE J. Sel. Areas Commmun., vol. 2, pp. 153-170, January 1984. and in "Simulation of Communication Systems", by M. C. Jeruchim, P. Balaban, and K. S. Shanmugan, New York: Plenum Press, 1992, ch. 5, authors mention that a factor of 2 is a reasonable uncertainty for BER estimation. Consequently, the inventors of this patent believe that error rate estimation accurate within a factor 3 (cf. FIGS. 10 to 12) appears to be satisfactory for most applications, and for adaptive systems even a weak but monotonic estimator might be sufficient.

Based on operational conditions off-line and on-line monitoring are distinguished. This invention is related to On-line monitoring.

On-line monitoring comprises the following classes among others:
  signal parameter measurement
  path metrics processing in trellis based decoding The performance of digital communication systems is a complex function of many signal parameters. Some of these parameters have a direct relationship to the BER while others are more qualitative. A well-known and quantitative method is to analyze the eye pattern. The feature of the eye pattern is the separation of the received signals into one of several levels at the sampling time. Noise and distortion will make the signal vary at the sampling time and thus decrease the separation between levels. A good example of this technique is the measurement of height and width of the eye (E. A. Newcombe and S. Pasupathy, "Error Rate Monitoring For Digital Communications", IEEE Proceedings, Vol. 70, no. 8, pp. 805-828, 1982). While the height of the eye indicates the margin against disturbances in the signal amplitude, the width of the eye shows the margin for timing variations, which may be just as important to performance.

Related is a method disclosed in U.S. Pat. No. 5,325,397 "Error rate monitor" to determine a discrete estimate of the probability density function of a decision variable e.g. received amplitude and to determine the estimated BER by similarity comparison with stored probability density functions, each associated with some BER.

A maximum-likelihood sequence detector using the Viterbi Algorithm bases its bit decisions on probabilistic decision variables (branch and path metrics differences) that are ultimately related to conditional probabilities of observing a given received signal when a given symbol or symbol sequence has been sent. The well-known Viterbi algorithm is described in several publications e.g. S. Benedetto and E. Biglieri, "Principles of Digital Transmission: With Wireless Applications", Kluwer Academic/Plenum Publishers, 1999.

The Viterbi algorithm is widely used for channel decoding of trellis codes in communication systems as well as for detection in the presence of ISI ("equalization") (G. D. Forney, Jr., "The Viterbi Algorithm", IEEE Proceedings, Vol. 61, pp. 268-278, 1973). In the ISI context, some may consider the term "detector" to be more appropriate. For practical reasons, the decoder may be designed such that the information bits associated with a branch on a survivor path at time t can be released when the decoder begins operation on the branches at time t+D (S. B. Wicker, "Error Control Systems for Digital Communication and Storage", Prentice Hall, 1995). D is the decoding depth, and is usually set to be five to ten times the constraint length of the code or the "memory" of the channel. An information-sequence error that occurs as a result of the release of information bits before the entire received sequence or stream has been decoded is called a truncation error. At low signal-to-noise ratio, the probability of truncation error is negligible for $D \geq 6M$, where M is the maximal memory order. We will hereinafter refer to the truncation mode Viterbi decoding as standard Viterbi decoding (SVD).

The achievable speed of standard Viterbi decoding is limited by the nonlinear Add-Compare-Select (ACS) recursion, which cannot be parallelized. It was shown (G. Fettweis and H. Meyr, "High-Speed Parallel Viterbi Decoding: Algorithm and VLSI-Architecture", IEEE Commun. Magaz., pp. 46-55, 1991 (later referred to as Fettweis91); H. Dawid and G. Fettweis, "A CMOS IC for Gb/s Viterbi Decoding: System Design and VLSI Implementation", IEEE Trans. Very Large Scale Integ. Systems, vol. 4, no. 1, pp. 17-31, 1996 (later referred to as Fettweis96)) that, despite the nonlinear recursion, it is possible to parallelize the recursive Viterbi algorithm, which we will call parallel Viterbi decoding (PVD). In PVD schemes, the received sequence of symbols is usually divided into blocks and these blocks are processed in a specific, overlapping manner, basically exploiting the self-synchronizing nature of the blindly started Viterbi algorithm and the so called path merging effect.

Based on these decision variables it is possible to produce reliability information along with or instead of the decided bit stream, which e.g. is done in so-called soft-output detectors (e.g. soft output Viterbi algorithm SOVA, or maximum a posteriori probability MAP, detectors). Typically this reliability information is then used in a downstream soft-decision FEC decoder, which can provide better decoding results by making use of this reliability information.

But also in the absence of a FEC decoder, the reliability information available in a hard decision output Viterbi detector allows to estimate the rate of decision errors.

U.S. Pat. No. 5,944,844, "Method for determining connection quality in a receiver utilizing a Viterbi Decoder" uses accumulated path metric differences, i.e. the sum of decision variables and the minimum of decision variables along the decoded path in the VA (Viterbi algorithm) to estimate BER. A drawback of this method is an increase of complexity since decision variables need to be stored until the trace-back step is completed and since accumulation of decision variable introduces complexity due to a floating-point format. Apart from the disclosure to compare estimates with predetermined threshold values the U.S. Pat. No. 5,944,844 fails to expose a practical mapping from the measured observable to a BER estimate.

U.S. Pat. No. 6,141,388, "Received signal quality determination method and systems for convolutionally encoded communications channels". Unlike the method of U.S. Pat. No. 5,944,844, rather than using decision variables accumulated along the decoded path, this invention uses only the final decision metric in a decoded frame. This final decision metric is then mapped to a BER estimate. The method is described only in connection with convolutionally encoded data streams and frame decoding. Again, there is no disclosure how to map the measured decision metrics to a BER estimate.

In the context of decoding or detection techniques utilizing the VA for optical data transmission European patent application 03002172.9 "Error rate estimation method for a receiver and receiver apparatus" suggests to determine the frequency of unreliable detection events. An unreliable detection event is defined as a decision under indifference amongst alternatives, e.g. when an output-relevant decision is made in a Viterbi detector between two alternative paths with identical metrics. This method is simple and provides very good estimation for high BER. Due to the high data rates in optical data transmission, this method is well usable down to a BER of $10^{-10}$. However, relatively long monitoring time is needed for estimating low BER. Also it is necessary to determine a calibration coefficient used in a BER estimation formula.

U.S. Pat. No. 5,768,285, "Circuit for Evaluating Bit Error Rate Performance of a Data Decoder Having a Viterbi Detector" describes a circuit for evaluating bit error rate performance of a data decoder having a Viterbi detector in the context of synchronous data channels, particularly those used in telecommunications and magnetic data recording e.g. disk drives. Statistics are computed about the Euclidean distance between the correct branch at a time n and the closest competing branch. This distance referred to as the amplitude error margin (AEM) in U.S. Pat. No. 5,768,285, is the distance between the current Viterbi decision metric and the decision boundary, which, when crossed, causes elimination of the correct path through the trellis as result of an error event. More specifically the difference between two Viterbi metrics for each state at the time n is calculated. After performing several other additions, subtractions and comparisons the resulting signal is counted and averaged over time in order to determine AEM statistics.

According to the disclosure of U.S. Pat. No. 5,878,098 "Method and Apparatus for Rate Determination in a Communications System" path metrics are used to determine the transmission data rate which may be a full, half, quarter etc. data rate. More specifically discriminant functions D12, D14, D18, D24, D28, D48 are calculated based on weighted differences of path metrics TM1, TM2, TM4, TM8 which are also referred to as total metrics in this reference. The various discriminant functions are compared to 0 and, depending on the results, a full, half, quarter or eighth rate frame is decoded provided that a cyclic redundancy check code does not indicate an error and a quality parameter is met.

It is the object of this invention to provide a more quantitative method and circuit for bit error estimation.

This object is achieved by the subject matters of the independent claims.

Preferred embodiments of the invention are the subject matters of the dependent claims.

Inventive embodiments based on equations (33) or (34) work without a priori knowledge about the type of channel. According to equations (33) or (34) the estimated BER is calculated from readily available path metrics information in a trellis-based receiver. As an advantage, it is not necessary to determine empirical or semi-empirical numerical coefficients or thresholds. The method is more complex than EP 03002172.9 but it allows more accurate estimation. As a further advantage, the BER estimation requires less monitoring time for the same accuracy. Implementation complexity can be traded against monitoring time by sub-sampling techniques during data collection.

BRIEF DESCRIPTION OF THE DRAWINGS

In the following embodiments of this invention are described referring to the accompanying drawings. In the drawings:

FIG. 7 shows a relation between quantized log probabilities and probabilities.

DETAILED DESCRIPTION

Abbreviations

| | |
|---|---|
| ACS: | Add-Compare-Select |
| AEM: | Amplitude Error Margin |
| APMD: | Absolute Path Metrics Difference |
| BER: | Bit Error Rate |
| DGD: | Differential Group Delay |
| FEC: | Forward Error Correction |
| ISI: | Inter-Symbol Interference |
| MAP: | Maximum A Posteriori Probability |
| MLSD: | Maximum-Likelihood Sequence Detection |
| MLSE: | Maximum-Likelihood Sequence Estimation |
| PVD: | Parallel Viterbi Decoding |
| RD: | Residual Chromatic Dispersion |
| SNR: | Signal-to-Noise Ratio |
| OSNR: | Optical Signal-to-Noise Ratio |
| SOVA: | Soft Output Viterbi Algorithm |
| SVD: | Standard Viterbi Decoding |
| VA: | Viterbi Algorithm |

Mathematical Symbols

| | |
|---|---|
| $a$: | sent bit |
| $\bar{a}$: | inverted sent bit |
| b: | base of logarithm |
| $B_q$: | maximal branch metrics |
| d: | smallest measured APMD |
| D: | decoding depth (truncation mode) |
| $E_S$: | set of error events starting positions |
| $E_E$: | set of error events ending positions |

-continued

| | |
|---|---|
| I: | transmitted vector |
| Î: | decoded vector |
| $I_t$: | subset threshold |
| i, k, m: | index |
| J: | oversampling parameter |
| K: | weighting parameter |
| L: | block length (parallel decoding) |
| LR: | likelihood ratio |
| $2^M$: | number of states at each stage of the trellis |
| M: | channel memory |
| N: | sequence length |
| n: | number of path metrics differences used for BER estimation |
| $n_i$: | events where APMD = i |
| $n_B$ | number of branches |
| p: | probability (density) |
| $p^c$: | (best) competitor path probability |
| $p_e$: | error probability |
| P: | log(p), log probability |
| $P_q$: | quantized log probability |
| $p^s$: | survivor path probability |
| $\overline{p_e}$: | averaged $p_e$ |
| Pr: | probability (mass) |
| Q | number of terms |
| q: | number of bits used for $P_q$ |
| qstep: | quantization step |
| S: | set of $P_q$ |
| s: | sub-sampling factor |
| V: | matrix of elements (sample sequence) |
| $V_i$: | sample vector |
| $v_{i,j}$: | sample |

The new estimation method is applicable to both the SVD and PVD techniques, and we will describe the application of the error monitoring method for both of them. For sake of simplicity, we will derive the new method for the case of MLSD "equalization" and binary transmission. This does not imply that application of the new estimation method is limited to this case. In the "equalization" scenario to be discussed, the channel memory M determines a number of states in the corresponding trellis, and two branches enter and leave each trellis state. For binary transmission, the number of the trellis states per stage is equal to $2^M$.

Figure 3:
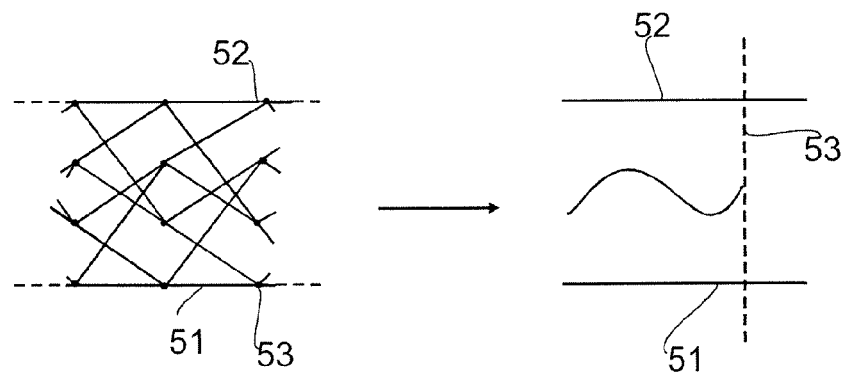
FIG. 3 shows a schematic illustration of paths in trellises.

In the following section, a schematic illustration of paths in a trellis 51 is used as shown in FIG. 3. The trellis 51 comprises a plurality of stages 53 corresponding to different points in time. A maximum likelihood detector determines a survivor path 52.

SVD Path Metrics Difference

Figure 4:
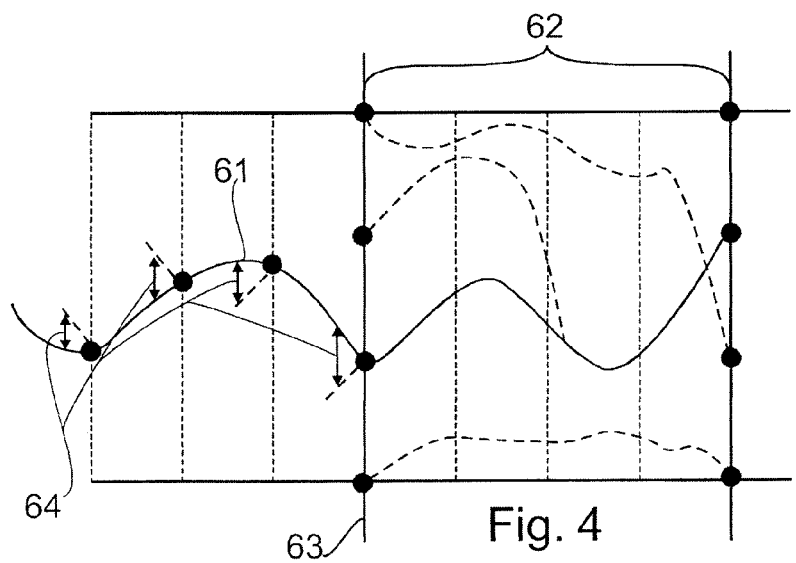
FIG. 4 illustrates APMDs for SVD.

The SVD attempts to find the best path in the trellis. Referring to FIG. 4, the decoded path 61 having the maximum likelihood corresponds to the most likely transmitted sequence. Decoding starts either after having received the last transmitted symbol or after having received D symbols. In the latter case, which is also referred to as truncation mode, it might be assumed that a window 62 comprising D stages slides over the trellis. The left side of sliding window 62 indicates stage 63 at which the final decision on the most likely path is being taken. In any case, each state along the actually decoded path may be characterized by the metrics difference of two paths entering the state.

An absolute difference of quantized log probabilities of two paths (quantized path metrics) entering the trellis state, named absolute path metrics difference (APMD) 64, is assigned to each state along the decoded path in the trellis. This information is used in a suitable way to assess the error rate.

To decrease hardware complexity of the BER estimation, the APMD values can be sub-sampled by a factor s, i.e. APMD values are taken only at every s'th bit decision. After some predetermined time of data collection, which must just be long enough to have sufficient statistical information in order to estimate the APMD value distribution, APMD values are utilized in the BER estimation algorithm. This will be explained in section "APMD to BER conversion" below.

PVD Path Metrics Difference

Figure 5:
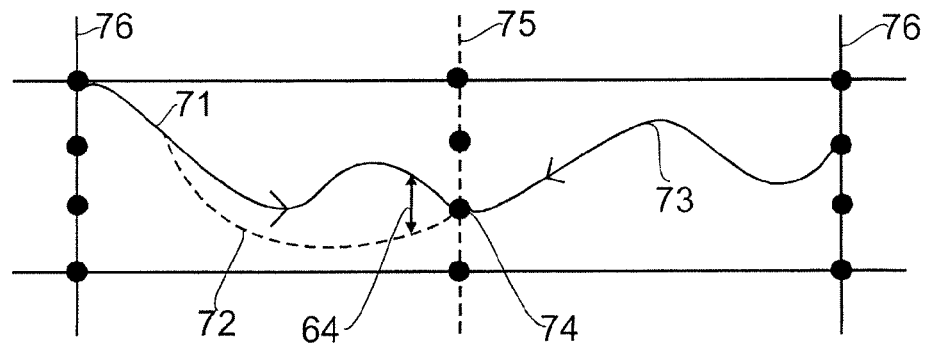
FIG. 5 illustrates APMDs for PVD mode 1.

The parallel Viterbi decoder (PVD) (Fettweis91, Fettweis96) utilizes decomposing the received sequence in blocks of length L. Two modes of BER estimation will be explained in connection with FIGS. 5 and 6. The decoding comprises three main steps.

First, the most likely states in the centers of blocks 75 are determined by selecting the best overall path created from connecting forward and backward best path segments 71 and 73 that are incident on the states in the centers of blocks 75.

Second, starting from these states, the most likely paths are found towards the block boundaries, again after connecting forward and backward path segments joining at the block boundary 76.

In a third step, now knowing the best paths between the most likely states in the middle of each block 75, the bits in each block are eventually decoded. This is known as traceback step.

To find the most likely state one has to select the best path among all trellis paths. Obviously, half of $2^M$ states at each stage of the trellis deliver 1 as decoded bit, and the rest of them deliver 0. In the same manner as for the SVD, we can assign the APMD values 64 to the states, which are located on the maximum-likelihood paths segments, both in the center 75 and at the boundaries 76 of each block, and thereafter we can use them for the BER estimation. We will name this approach PVD mode 1 illustrated in FIG. 5.

As in SVD, in PVD mode 1 scheme, APMD values are taken from the two path segments entering a "best node" in the trellis, using either the forward or the backward path segment.

Figure 6:
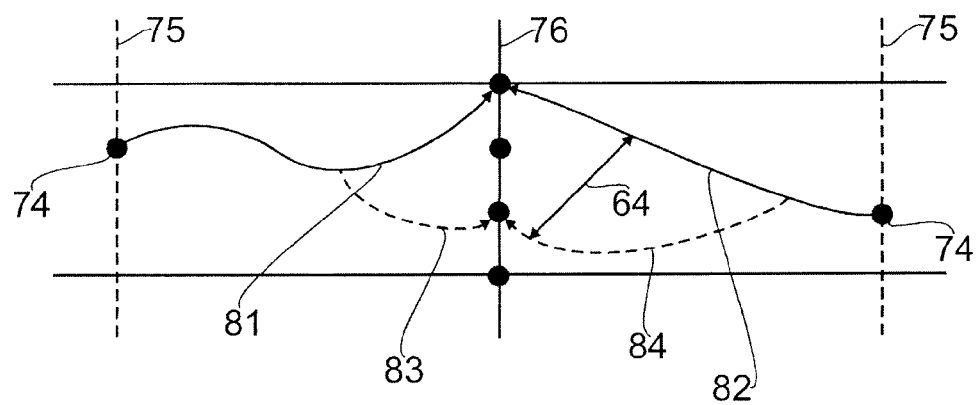
FIG. 6 illustrates APMDs for PVD mode 2.

Alternatively, the absolute path metrics difference (APMD) can alternatively be defined as the absolute difference of quantized log probabilities (quantized path metrics) of two most probable paths 81, 82 and 83, 84, decoding 1 and 0, respectively, at a specific trellis stage e.g. at a block boundary 76. Reference number 81 designates the forward segment of the best path. Reference number 82 designates the backward segment of the best path. Reference number 83 designates the forward segment of the best competitor. Reference number 84 designates the backward segment of the best competitor. Unlike in mode 1, these two paths can traverse through different states as shown in FIG. 6. Such values are available both after the first and after the second step of the PVD, i.e. at block centers and at block boundaries. Practically, each block can be characterized by two APMD values. The first one is connected to the middle of block and the second one is connected to the end of block. We will name this approach PVD mode 2.

As for the SVD, we can store APMD values 64 and thereafter use them for the BER estimation. They can be taken either after first or second decoding step. To improve data collection statistics, APMD values can be taken after both first and second decoding step. To reduce hardware complexity, APMD values may be sub-sampled by a factor s, both, in mode 1 and mode 2.

After the data collection period the APMD values are converted to BER estimations as explained in section "APMD to BER conversion" below.

Error Analysis for SVD and PVD Mode 1

Binary signaling and, without loss of generality, a sequence of length N is considered. The transmitted binary information sequence can then be represented by vector I as $$I=(I_1,I_2,\ldots,I_N) \quad (1)$$

where the symbols $\{I_i\}$ may take the values 0 and 1. Let the estimated symbols be denoted by $\{\tilde{I}_i\}$ and hence the decoded sequence as $$\tilde{I}=(\tilde{I}_1,\tilde{I}_2,\ldots,\tilde{I}_N). \quad (2)$$

Let the state of correct path at time k be defined as $$S_k=(I_{k-1},I_{k-2},\ldots,I_{k-M}) \quad (3)$$

and the state of decoded path at time k be defined as:

$$\tilde{S}_k=(\tilde{I}_{k-1},\tilde{I}_{k-2},\ldots,\tilde{I}_{k-M}). \quad (4)$$

The receiver can be designed to sample the incoming signal J times in a bit slot. Therefore, the sample sequence can be described by matrix of J×N elements $$V=(V_1,V_2,\ldots,V_N), \quad (5)$$

where $$V_i=(v_{i1},v_{i2},\ldots,v_{iJ})^T, i=1,2,\ldots,N \quad (6)$$

is a (column) vector of J samples corresponding to i-th bit slot.

In the following we assume that the estimated path through the trellis diverges from the correct path at time k and remerges with the correct path at time k+l. Thus, $\tilde{S}_k=S_k$ and $\tilde{S}_{k+l}=S_{k+l}$, but $\tilde{S}_m \neq S_m$ for k<m<k+l. As usual, we will call this an error event. Since the channel spans M+1 symbols it follows that l≥M+1.

For such an error event, we have $\tilde{I}_k \neq I_k$ and $\tilde{I}_{k+l-M-1} \neq I_{k+l-M-1}$, but $\tilde{I}_m=I_m$ for k−M≤m≤k−1 and k+l−M≤m≤k+l−1. The shortest possible error event (l=m+1) will produce one error. The next longer one produces two errors, and the possible numbers of errors produced in the longer error events (l≥m+3) can be found by analyzing the trellis structure (J. G. Proakis, "Digital Communications", 3rd ed., McGraw-Hill, 1995).

The probability of longer error events is lower than the probability of shorter error events, and most dominant are the single error events of length l=m+1.

The magnitude of the difference between two merging paths entering the state $\tilde{S}_{k+l}=S_{k+l}$ contains probabilistic information on an error that has happened in state $\tilde{S}_{k+1}=S_{k+1}$. Heuristically, if the observed metric difference is small, an error is more likely to have occurred than in the case where the metric difference is large. This is explained in more detail in the following.

The reliability of decision $\tilde{I}_k$ can be obtained from the likelihood ratio (LR) of transmitted symbol $I_k$ which is defined as $$(LR)_k = \frac{Pr(I_k=1|V)}{Pr(I_k=0|V)} \quad (7)$$

Without loss of generality and for ease of exposition the samples $v_{i,j}$, which constitute the elements of the matrix V, might be assumed to be quantized to a finite set of values. This avoids mathematical problems with probability or likelihood densities when $v_{i,j}$ are continuous variables corresponding to analogue samples. For this reason notation does not need to distinguish carefully between probability mass and probability density functions, denoted as Pr and p, respectively.

Assuming that different transmitted sequences are uniformly distributed we have $$(LR)_k = \frac{Pr(V|I_k=1)}{Pr(V|I_k=0)} \quad (8)$$

The nominator and denominator can be replaced by $$Pr(V|I_k=a) = \sum_{I_k \in S_k^a} p(V|I_k), \quad (9)$$

$$a=0,1$$

where $S_k^a$ is the set of sequences $\{I_k\}$ such that $I_k=a$

It follows that $$(LR)_k = \frac{\sum_{I_k \in S_k^1} p(V|I_k)}{\sum_{I_k \in S_k^0} p(V|I_k)} \quad (10)$$

The last equation is approximated by $$(LR)_k \approx \frac{p(V|I_k^1)}{p(V|I_k^0)} \quad (11)$$

where $I_k^a$ is the most likely sequence in the set $S_k^a$. In this case, the decision rule becomes $$\tilde{I}_k = \begin{cases} 0, & (LR)_k < 1 \\ 1, & (LR)_k \geq 1 \end{cases} \quad (12)$$

Therefore, the error probability of decision $\tilde{I}_k=\bar{a}$ for the aforementioned error event can be calculated by $$p_e(\tilde{I}_k) = \frac{p(V|I_k^{\bar{a}})}{p(V|I_k^a) + p(V|I_k^{\bar{a}})} \geq 0.5 \quad (13)$$

Let us denote the probability of the most likely paths entering the state $\tilde{S}_k$ and $\tilde{S}_{k+l}$ as $p(\tilde{S}_k)$ and $p(\tilde{S}_{k+l})$, respectively. One can write $$p(\tilde{S}_{k+l})=p(\tilde{S}_k)p(\tilde{S}_k,\tilde{S}_{k+l}) \quad (14)$$

In equation (14) $p(\tilde{S}_k,\tilde{S}_{k+l})$ denotes the conditional path probability assigned to the part of the decoded sequence between the states $\tilde{S}_k$ and $\tilde{S}_{k+l}$.

Assuming an error event, the probability of the competitor path to $\tilde{S}_{k+l}$, which would be correct, can be defined as $p^c(\tilde{S}_{k+l})$.

$$p^c(\tilde{S}_{k+l})=p(\tilde{S}_k)p^c(\tilde{S}_k,\tilde{S}_{k+l}) \quad (15)$$

In equation (15) is $p^c(\tilde{S}_k,\tilde{S}_{k+l})$ the conditional probability of the correct path segment between the states $\tilde{S}_k$ and $\tilde{S}_{k+l}$. By definition of a competitor path, equation (16) holds in general:

$$\frac{p^c(\tilde{S}_{k+l})}{p^c(\tilde{S}_{k+l})+p(\tilde{S}_{k+l})} + \frac{p(\tilde{S}_{k+l})}{p^c(\tilde{S}_{k+l})+p(\tilde{S}_{k+l})} = p_e(\tilde{S}_{k+1}) + \bar{p}_e(\tilde{S}_{k+1}) = 1 \qquad (16)$$

Using this notation we can write $$p(Y|I_k^{\bar{a}}) = p(\tilde{S}_N) = p(\tilde{S}_k)p(\tilde{S}_k,\tilde{S}_{k+l})p(\tilde{S}_{k+l},\tilde{S}_N) \qquad (17)$$

and if we suppose that $$p(Y|I_k^a) = p(\tilde{S}_k)p^c(\tilde{S}_k,\tilde{S}_{k+l})p(\tilde{S}_{k+l},\tilde{S}_N) \qquad (18)$$

which is true in most of cases, the error probability of decision $\tilde{I}_k = \bar{a}$ can then be expressed as:

$$p_e(\tilde{I}_k) = \frac{p(\tilde{S}_k,\tilde{S}_{k+l})}{p(\tilde{S}_k,\tilde{S}_{k+l}) + p^c(\tilde{S}_k,\tilde{S}_{k+l})} \qquad (19)$$

To each state on the decoded path, let us assign the absolute difference between the quantized log probabilities $APMD_i$ of two paths entering the state i. In the MLSD, the path probabilities are usually transformed in logarithmic domain and all calculations are done using these "log probabilities". And practically, instead of using log probabilities, the MLSD deals with quantized logarithms of probabilities. The quantized log probabilities $P_q$ used as integer metrics can take values from the set $S = 0, 1, 2, \ldots, 2^q - 1$, where q is a number of bits used for the binary representation of the quantized value. We introduce the connection between metrics $P_q$ and probabilities p using the metrics quantization function G as:

$$P_q = G(\log_b(p)) \qquad (20)$$

where p is a probability taking values from 0 to 1 and b is base of logarithm, and where G performs uniform quantization of log probabilities. One possible choice of G is described in equation (37). Provided that the quantization steps are small enough, the following holds:

$$G\left(\log_b\left(\frac{p}{q}\right)\right) \approx G(\log_b(p)) - G(\log_b(q)) \qquad (21)$$

One can define an "inverse" function H that maps a quantized log probability back to a corresponding probability, such that:

$$p \approx H(G(\log_b(p))) \qquad (22)$$

For easy calculation, the function H can be stored in a look-up-table. An example is given in FIG. 7.

Using equations (14), (15), (19), (22) and (21) one can write:

$$p_e(\tilde{I}_k) \approx \frac{H(|G(\log_b(p(\tilde{S}_{k+l}))) - G(\log_b(p^c(\tilde{S}_{k+l})))|)}{1 + H(|G(\log_b(p(\tilde{S}_{k+l}))) - G(\log_b(p^c(\tilde{S}_{k+l})))|)} \qquad (23)$$

The terms $|G(\log_b(p(\tilde{S}_{k+l}))) - G(\log_b(p^c(\tilde{S}_{k+l})))|$ are APMDs that will be used for equation (30). Equation (23) is applicable for the SVD and PVD mode 1. A similar derivation is possible for PVD mode 2 as will be shown in the next section.

Error Analysis for PVD Mode 2

In this section we explain equation (19) for PVD mode 2. The use of these error probabilities to estimate the overall probability of error is described in section "BER estimation" below.

Let us analyze the equalizer that has four states (M=2) with blocks of length L. The aforementioned three steps in the PVD can be summarized as:

Find the most likely state in the middle of each block by forward and backward Viterbi algorithm. Let $\tilde{S}_i$, $\tilde{S}_i \in \{00, 01, 10, 11\}$ denote the most likely state in the middle 75 of block i.

Find the most likely state between any two neighboring central states. Let $\tilde{S}_{i+L/2}$ denote the most probable state between the states $\tilde{S}_i$ and $\tilde{S}_{i+L}$, at the block boundary.

Apply backward and forward Viterbi decoding from the state $\tilde{S}_{i+L/2}$ to $\tilde{S}_i$ and $\tilde{S}_{i+L}$, respectively.

Figure 8:
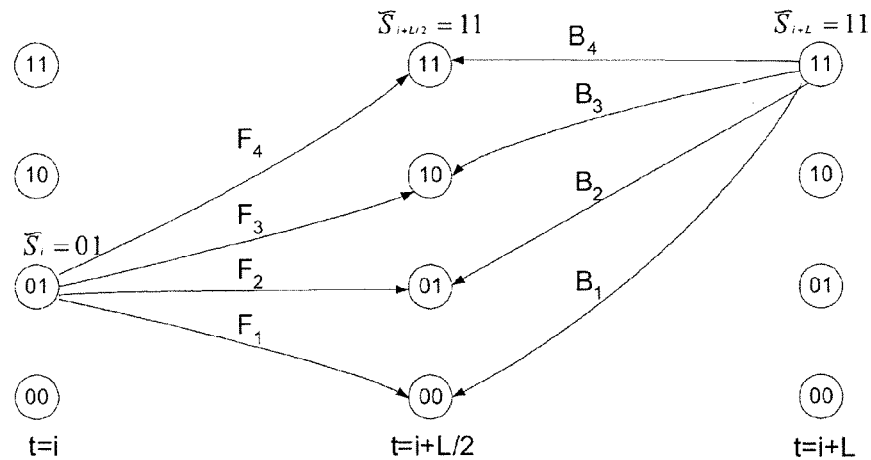
FIG. 8 illustrates the second step of PVD.

A part of the trellis related to the second step of the PVD is presented in FIG. 8. Obviously, two states decode zero and the other two ones decode unit. For sake of an example let us assume that the path consisting of the "forward" path segment $F_4$ concatenated with the "backward" path segment $B_4$ is the best path connecting $\tilde{S}_i$ to $\tilde{S}_{i+L}$, via $\tilde{S}_{i+L/2}$.

Let the states 01 and 11 deliver 1 as decoded bit and the states 00 and 10 deliver 0 as decoded bit. By $p(Y_i)$, Y=F, B and $i=1, 2, \ldots, 4$ we denote corresponding path probabilities in FIG. 1. Thus, we have $$P_1 = P(F_1) + P(B_1)$$

$$P_2 = P(F_2) + P(B_2)$$

$$P_3 = P(F_3) + P(B_3)$$

$$P_4 = P(F_4) + P(B_4) \qquad (24)$$

Let us define the probabilities of the best paths decoding 0 and 1 at time i+L/2 as $$P_{max}(0) = \max(P_1, P_3)$$

$$P_{max}(1) = \max(P_2, P_4), \qquad (25)$$

respectively.

If we suppose that an error event starts at time k, k<i+L/2 and ends up at time k+l, k+l>i+L/2 using the equation (19) one obtains equation (26) for the error probability of the decision $\tilde{I}_k = \bar{a}$:

$$p_e(\tilde{I}_k) = \frac{p(\tilde{S}_k,\tilde{S}_{k+l})}{p(\tilde{S}_k,\tilde{S}_{k+l}) + p^c(\tilde{S}_k,\tilde{S}_{k+l})} \qquad (26)$$

$$= \frac{p_{max}(\bar{a})}{p_{max}(\bar{a}) + p_{max}(a)}$$

$$= \frac{p_{max}(a)/p_{max}(\bar{a})}{1 + p_{max}(a)/p_{max}(\bar{a})} \geq 0.5$$

In this case, equation (23) can be written as:

$$p_e(\tilde{S}_{k+1}) \approx \frac{H[|G(\log_b(p_{max}(\bar{a}))) - G(\log_b(p_{max}(a)))|]}{1 + H[G(\log_b(p_{max}(\bar{a}))) - G(\log_b(p_{max}(a)))]}. \quad (27)$$

BER Estimation

While the Viterbi decoder estimates the most likely transmitted sequence, it cannot detect error events. We have only path metrics differences assigned to the states on the most likely path. Some of them will be related to the ends of error events, but most of them will not.

Let us suppose that we are able to detect the error events and that we have n stored path metrics differences. The probabilities of paths entering the state placed on the decoded path at time i will be denoted as $p_i$ and $p_i^c$, where $p_i^c$ is the probability of competitor path that is not identical to the decoded path. By construction of VA, there must be $p_i \geq p_i^c$.

The error probability at bit location i can be approximated by $$p_e(i) \approx \frac{p_i^c}{p_i + p_i^c} \quad (28)$$

Then, the estimated BER can be calculated by $$BER = \frac{1}{n} \sum_{i=1}^{n} P_e(i) = \frac{1}{n} \sum_{i=1}^{n} \frac{p_i^c}{p_i + p_i^c} \quad (29)$$

Now, using equations (23) and (29) the BER estimation can be defined as $$BER \approx \frac{1}{n} \sum_{i=1}^{n} \frac{H[APMD_i]}{1 + H[APMD_i]}, \text{ wherein} \quad (30)$$

$$APMD_i = |G(\log_b(p_i)) - G(\log_b(p_i^c))| \quad (31)$$

An APMD observable can theoretically take values from 0 to $n_B B_q$, where $B_q$ is maximal branch metrics and $n_B$ is the number of branches connecting the starting state in the trellis to the state assigned to the last stored path metrics difference.

Let us denote by $n_i$ the number of events with APMD=i. One can write $$n = \sum_{i=0}^{n_B B_q} n_i = n_d + \sum_{i=d+1}^{n_B B_q} n_i, \quad (32)$$

where d is the smallest measured APMD. Using equations (30) and (32) we obtain $$BER \approx \sum_{i=0}^{n_B B_q} \frac{n_i}{n} \frac{H[i]}{1 + H[i]} \quad (33)$$

Equation (33) can be used for BER estimation for PVD mode 2 as well.

In another embodiment, one could use the first Q number of terms in equation (33) resulting in equation (32):

$$BER \approx \sum_{i=0}^{Q} \frac{n_i}{n} \frac{H[i]}{1 + H[i]}, 1 < Q < n_B B_q \quad (34)$$

By using only the first non-zero term $n_d$ of the sum in equation (32) the BER estimation becomes $$BER > \frac{n_d}{n} \frac{H[d]}{1 + H[d]}. \quad (35)$$

In this case, the BER estimation is calculated as $$BER \approx K_d \frac{n_d}{n} \frac{H[d]}{1 + H[d]} \quad (36)$$

where $K_d$ is a weighting parameter depending on d, in general. $K_d$ can be obtained after processing of simulation or calibration measurement results. In a practical implementation, $K_d$ has a fixed value, independent of d. Experimental evidence in an optical communication receiver shows that even a value of $K_d$=1 can be used. The difference between (36) and EP 03002172.9 is that here the smallest non-zero APMD value is utilized, whereas in EP 03002172.9 only the zero APMD value is utilized.

APMD to BER Conversion

As already explained in connection with equation (20), in the Viterbi decoder the calculation of both branch and path metrics is performed by quantized log probabilities.

The number of different quantized values $P_q$ in equation (20) is usually restricted by complexity and decoder performance. The base of logarithm b is not an important parameter for the process of decoding. An example of the probability quantizer mapping G is described by following equation:

$$P_q = G(\log_b(p)) = \quad (37)$$
$$\begin{cases} i, & (i+1)qstep < -\log_b(p) \leq iqstep, \quad i = 0, 1, 2, \ldots, 2^q - 2 \\ 2^q - 1, & (2^q - 1)qstep \leq -\log_b(p), \quad i = 2^q - 1 \end{cases}$$

The parameter qstep is the metric quantization step, which is chosen depending on the number of quantization bits q (metric resolution). Usually, one can define the minimum log probability to be quantized ($\log_b(p_{min})$) and the qstep is then calculated as $$qstep = -\log_b(p_{min})/(2^q - 1) \quad (38)$$

Conversion of quantized log probability to real probability can be performed using function H as $$p = H(P_q) = b^{-P_q \cdot qstep} \quad (39)$$

Practical Implementation

The BER calculation utilizing equation (30) would be considerably complex if one calculates the BER estimation for each block and averages it at the end of estimation period. A much better solution is to count events of certain APMD and estimate the BER at the end of estimation period. The resulting estimation can still be further averaged to reduce the estimator variance.

Using equation (33) we obtain $$BER \approx \sum_{i=0}^{Q} \frac{n_i}{n} \frac{H[i]}{1+H[i]} \qquad (40)$$

$$= \sum_{i=0}^{Q} p(i) H_n(i)$$

$$= p(d) H_n(d) + \sum_{i=d+1}^{Q} p(i) H_n(i)$$

Figure 1:
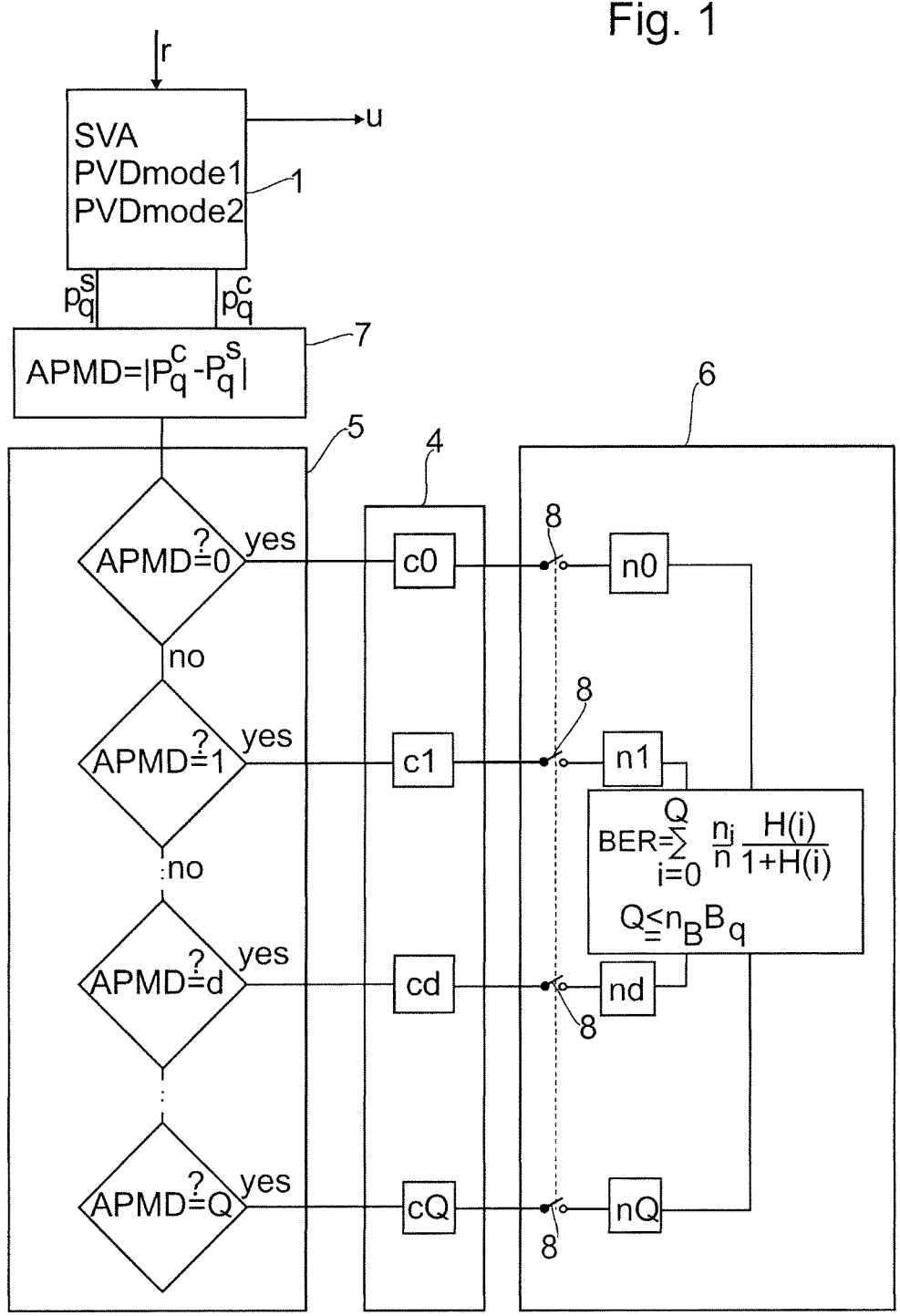
FIG. 1 shows a BER estimating circuit pursuant to this invention.
Figure 2:
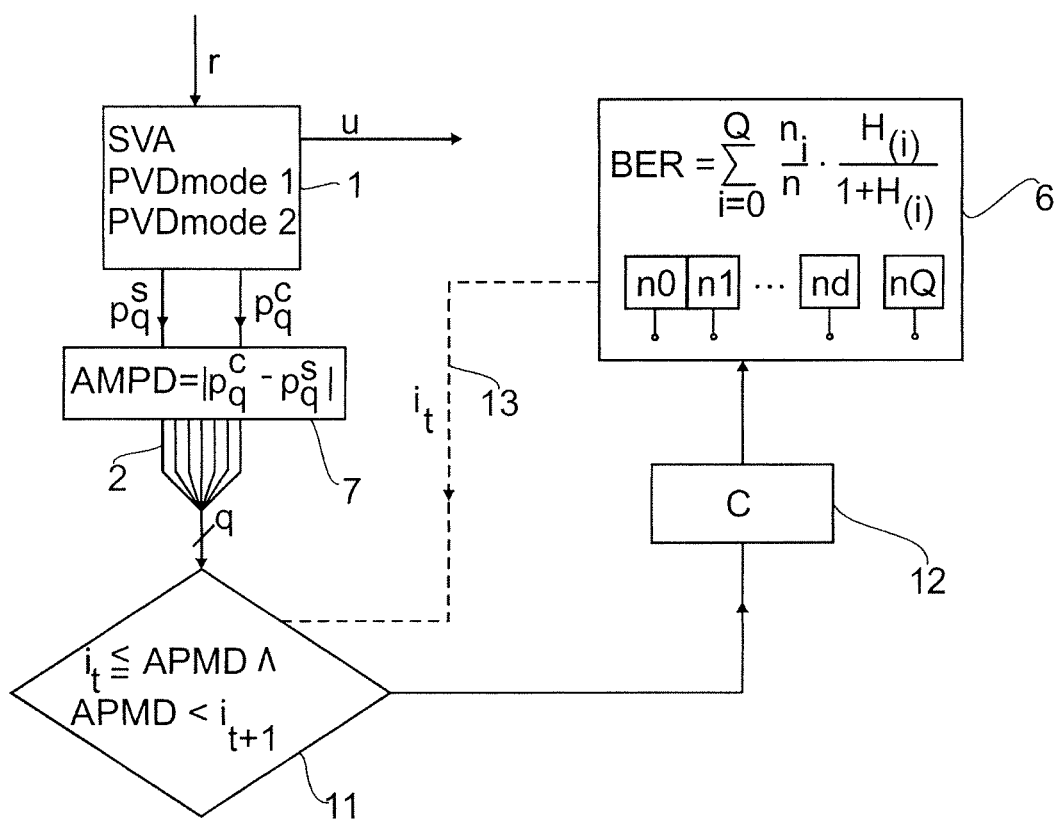
FIG. 2 shows another BER estimating circuit pursuant to this invention.

Circuits for evaluating equation (40) are shown schematically in FIGS. 1 and 2. The circuits comprise a maximum likelihood detector 1 which receives analog or quantized, pseudo-analog data r and outputs detected or decoded data u. Further, the maximum likelihood detector 1 outputs quantized log probabilities of the survivor path $P_q^s$ and the best competitor $P_q^c$. Arithmetic circuit 7 calculates the absolute difference between the quantized log probabilities of the survivor and the best competitor path, thereby obtaining APMDs 2. In a real implementation, the arithmetic circuit may be integrated into the maximum likelihood detector 1. By definition, the path metric of the survivor path indicates a higher likelihood. Provided that the quantized log probabilities $P_q$ calculated in compliance with FIG. 7, the path metric of the survivor path is lower than its best competitor.

In distribution circuit 5 events are detected. A kind of events can be defined in a way that the APMD has a special value i, i∈{1, 2, . . . , d, . . . Q} as shown in FIG. 1. To each kind of events a counter ci of counter array 4 is assigned such that each counter counts the events of one kind. Finally calculation circuit 6 evaluates equation (40) after a data collection period n. To this end switches 8 are closed for a moment after the data collection period to read the counter values into memory cells ni within calculation circuit 6.

In another embodiment sub-sets of APMDs may be defined by subset thresholds $i_t$ and $i_{t+1}$ as shown in FIG. 2. Selector circuit 11 determines as to whether the APMD value belongs to one of the sub-sets of APMD values. In this embodiment, the sum in equation (40) runs over the index t and the functions H and $H_n$ are evaluated at a position $i_m$ between or at the boundaries $i_t$ and $i_{t+1}$. For example, $i_m$ may be chosen to be the arithmetic or geometric mean of $i_t$ and $i_{t+1}$.

Similar to equation (36), a heuristic factor K may be inserted into equation (33). The factor K may be obtained from simulations and may compensate for the exact place within the subsets from which the APMD argument for the H function is taken. Further, measurements over a sample set of optical channels have shown that equation (36) correctly estimates the BER e.g. in a range of $10^{-6}$ to $3 \cdot 10^{-4}$. Below $10^{-6}$ the measured BERs become unreliable due to limited measurement time, but equation (36) still seems to provide correct BER estimates. Above $3 \cdot 10^{-4}$ the BER is underestimated by equation (36). At BER=0.1, equation (36) returns 0.01 and consequently underestimates the actual BER by a factor of 10. This monotonic non-linearity may be compensated by an empirical correction formula, which may replace the constant factor K.

To avoid complexity introduced by a large number of counters, we can also count subsets of quantized log probabilities in a round-robin fashion, collecting parts of the APMD histograms in a sequential manner. Such an embodiment is shown in FIG. 2. The circuit of FIG. 2 comprises only one counter 12 and calculation circuit 6 may implement equation (36).

In another embodiment the thresholds $i_t$ and $i_{t+1}$ may be changed in a round-robin fashion so that the different kinds of events are counted one kind after another by counter 12. Practically, for each APMD, the lower limit of APMD being e.g. 0 or d and the upper limit of APDM being Q, $d \leq Q \leq n_B B_q$, we can provide measurement time of $T_m/(Q+1)$ or $T_m/(Q-d+1)$, respectively, where $T_m$ is total measurement period. After each measurement time, the count of counter 12 is read via switch 18 into the correct memory cell ni. The maximal Q can actually be chosen as a function of the measured bit error rate. The higher the bit error rate, the lower the maximal Q. Alternatively, the maximal Q can be calculated from the smallest measured APMD=d or/and the most frequent APMD, i.e. the APMD for which the highest counter value is obtained. The higher the smallest measured APMD=d or/and the most frequent APMD, the higher the maximal Q that is measured.

It is clear to skilled persons in the art that distribution circuit 5 and selector circuit 11 could be exchanged in the embodiments shown in FIGS. 1 and 2.

As explained above, in order to obtain relative frequencies of APMDs, which may be used as estimates for probabilities of APMDs we may implement up to $n_B B_q$ counters.

The parameter $n_B$ of the SVD is usually unknown and could be very high for the PVD. Equation (39) shows that the contribution of very high path metric differences to the final BER estimation is negligible. A convenient upper limitation Q of APMD values decreases the BER estimation complexity because this reduces the number of counters and, on the other hand, does not severely decrease the estimator performance. A similar effect can be obtained by grouping all high APMD values into one subset.

Of similar complexity as FIG. 2 would be an implementation of equation (36). This implementation also needs only a single counter. Minor complexity is added by an additional comparison as to whether a new APMD output by arithmetic circuit 7 is smaller than the smallest APMD observed up to now during a measurement period $T_m$. If the new APMD is smaller than the smallest APMD observed up to now, the counter 12 is (re)set to 1 and the new APMD is stored in the register for $i_t$. This resetting may comprise a reset to 0 and an increment by 1 or the counter may be reset to 0 and 1 may be added after the measurement in calculation circuit 6.

By definition the new APMD is the smallest APMD observed during the measurement period $T_m$ up until then. So there is no other APMD=$i_t$ that has been to be counted up until then. The complexity of calculation circuit 6 is reduced, since it only needs to implement equation (36), which does not require a loop for implementing the sum over i as is required for example by equations (33) and (34).

For very low BER and too short estimation period the counter statistics in vicinity of value $P_q$=d becomes unreliable. To mitigate this problem one can average the BER values to reduce the variance of the BER estimation.

Figure 9:
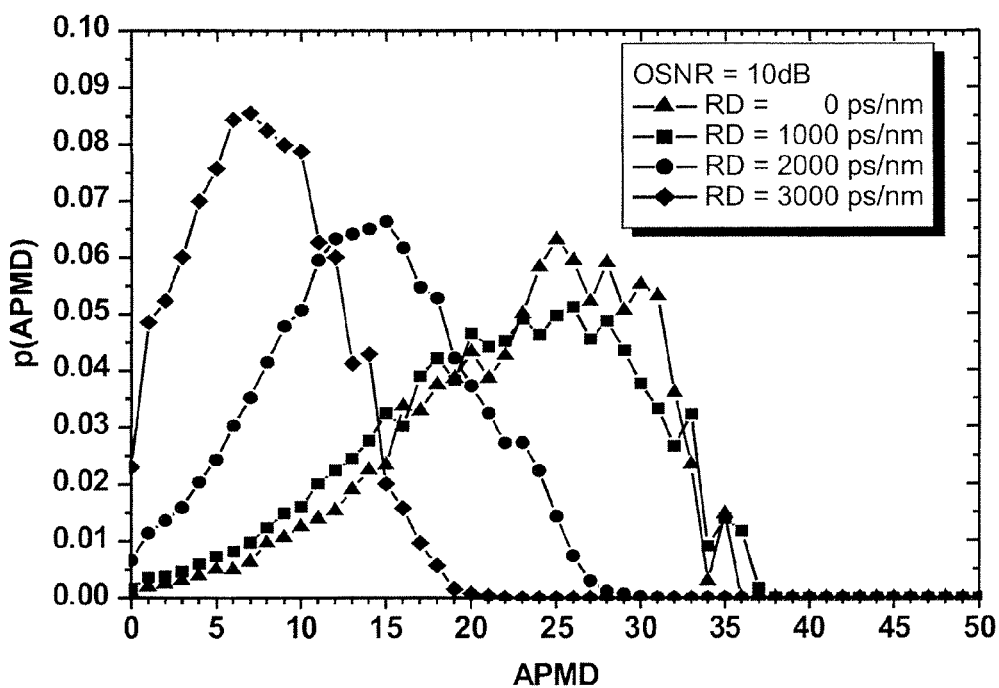
FIG. 9 shows discrete probability density functions for PVD.

The normalized APMD histograms p(APMD) of some optical channels for four-state PVD mode 2 are presented in FIG. 9.

Simulation Results

We demonstrate the efficiency of the BER estimation by presentation of some simulation results in FIGS. 9 to 12.

Figure 10:
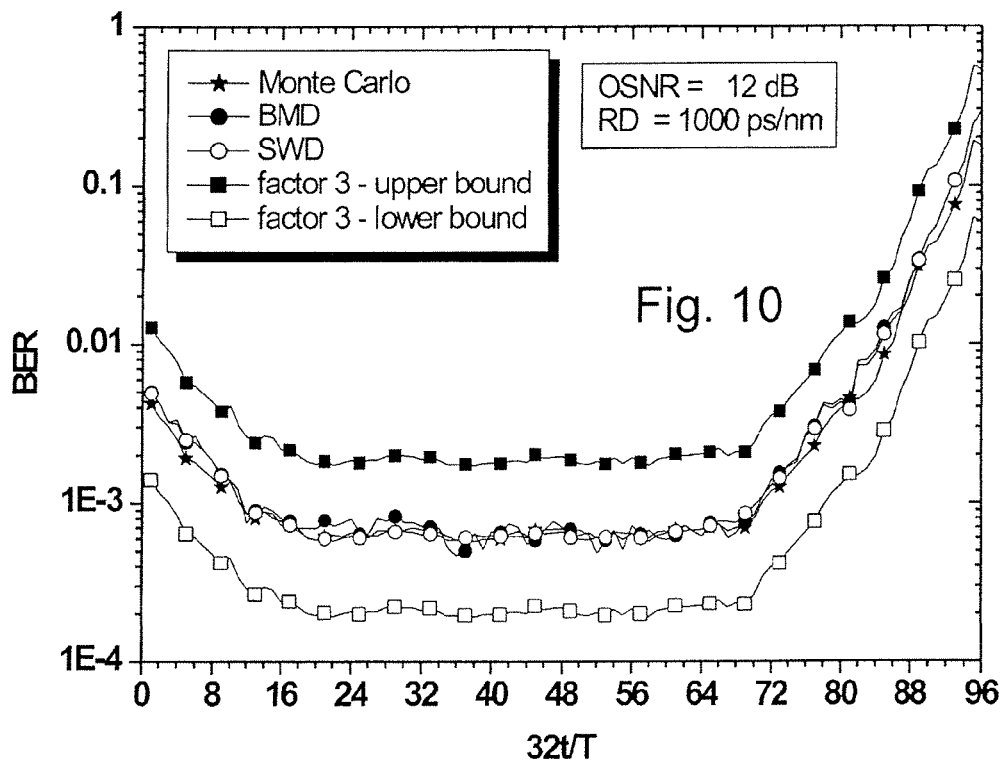
FIG. 10 shows the results of BER estimation of slightly distorted channel.
Figure 11:
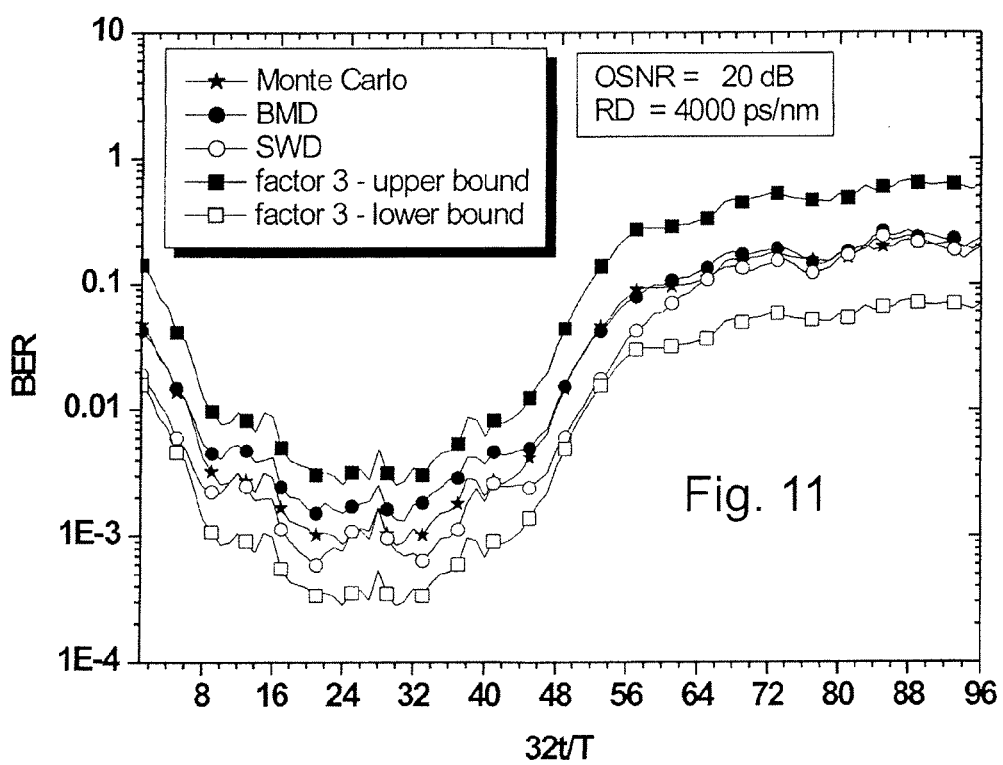
FIG. 11 shows the results of BER estimation of highly distorted channel.

We simulated transmission of about one million bits, and we changed the sampling phase in an MLSD receiver. Using about $10^6$ bits implies that, in this simulation setup, a BER below $10^{-4}$ cannot be estimated meaningfully by Monte Carlo method because the observation interval is too short. In FIGS. 10 and 11 we present simulation results for two selected optical channels. As we see, the deviation of estimator is higher for severely distorted channel in FIG. 11 compared to slightly distorted channel in FIG. 10, but the results still accurate within a factor 3.

Figure 12:
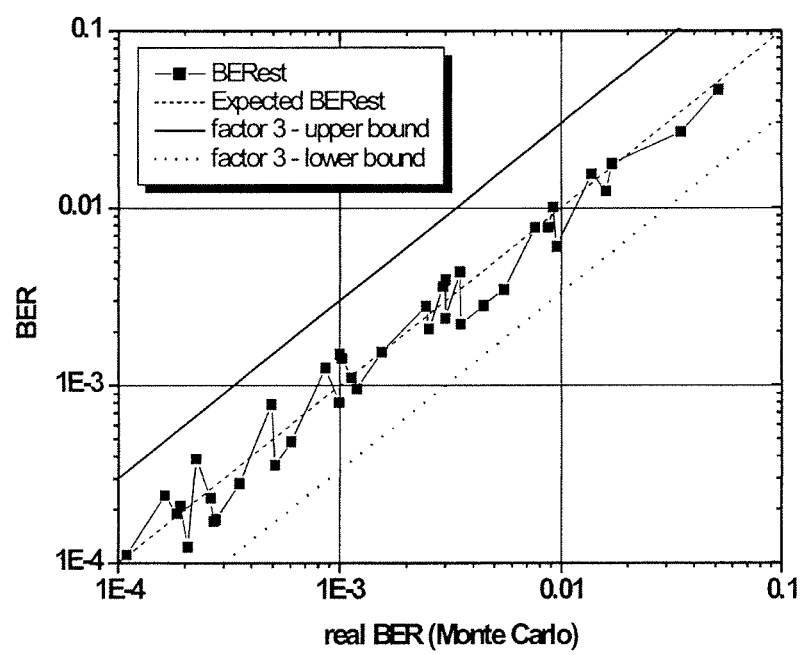
FIG. 12 shows a plot comparing a BER estimation performed in compliance with this invention to a Monte Carlo BER.

To check accuracy of suggested method, simulations were run for several optical channels having different DGD and OSNR. Simulation results are presented in FIG. 12, showing the power of the estimation method.

Further modifications and variations of the present invention will be apparent to those skilled in the art in view of this description. Accordingly, this description is to be construed as illustrative only and is for the purpose of teaching those skilled in the art the general manner of carrying out the present invention. It is to be understood that the forms of the invention shown and described herein are to be taken as the presently preferred embodiments. It should be understood that the detailed description as well as the drawings are not intended to limit the present invention to the particular illustrative embodiments disclosed, but rather the described illustrative embodiments merely exemplify the various aspects of the present invention, the scope of which is defined by the appended claims.

| | |
|---|---|
| 1 | Viterbi detector |
| 2 | APMD output |
| 4 | counter array |
| 5 | distribution circuit |
| 6 | calculation circuit |
| 7 | arithmetic circuit |
| 8 | switch |
| 11 | selector circuit |
| 12 | counter |
| 13 | feedback line |
| 18 | switch |
| 51 | trellis |
| 52 | (survivor) path |
| 53 | point in time (stage) |
| 61 | decoded path |
| 62 | sliding window |
| 63 | decision stage |
| 64 | APMD |
| 71 | forward segment of best path |
| 72 | forward segment of best competitor |
| 73 | backward segment of best path |
| 74 | best state |
| 75 | block center |
| 76 | block boundary |
| 81 | forward segment of best path |
| 82 | backward segment of best path |
| 83 | forward segment of best competitor |
| 84 | backward segment of best competitor |

The invention claimed is:

1. A method for estimating a bit error rate in a data transmission system comprising:
    detecting symbols by a maximum likelihood detector, that provides path metrics of a decoded path and a best competitor path at predetermined symbol positions;
    calculating quantized absolute path metric differences between the decoded path and the best competitor path at said predetermined symbol positions; and
    counting events when a quantized absolute path metric difference is equal to one of a set of difference values, thereby obtaining an event count for each difference value in the set of difference values;
    estimating the bit error rate based on a summation of partial bit error rates, wherein each partial bit error rate is based on a relationship of the event count for a first difference value from the set of difference values and a path probability corresponding to the first difference value.

2. The method of claim 1, wherein the event count is multiplied by a factor thereby obtaining a weighted event count.

3. The method of claim 1, wherein events are counted during a measurement period; and further comprising:
    comparing a new absolute path metric difference with the difference value;
    when the new absolute path metric difference is smaller than the difference value performing:
        setting the difference value equal to the new absolute path metric difference; and
        resetting the counter value to one.

4. The method of claim 2, wherein counting is performed for different kinds of events thereby obtaining event counts for each kind of event; each kind of event being defined by a range of difference values; wherein estimating the bit error rate is based on a sum of all weighted event counts.

5. The method of claim 1, and further comprising applying a function to said one of said set of difference values that converts quantized log probabilities to probabilities thereby obtaining a function value; wherein estimating the bit error rate is based on said function value.

6. The method of claim 5, wherein estimating the bit error rate based on said function value comprises dividing said function value by the sum of 1 plus said function value.

7. A circuit for estimating a bit error rate in a data transmission system comprising:
    a maximum likelihood detector configured to detect symbols and provide path metrics of a decoded path and a best competitor path at predetermined symbol positions;
    an arithmetic circuit configured to compute quantized absolute path metric differences between the decoded path and the best competitor path at said predetermined symbol positions;
    a counter configured to count events when a quantized absolute path metric difference is equal to one of a set of difference values and produce a counter value for each difference value in the set of difference values; and
    a calculation circuit configured to estimate the bit error rate based on a summation of partial bit error rates, wherein each partial bit error rate is based on a relationship of the counter value for a first difference value from the set of difference values and a path probability corresponding to the first difference value.

8. The circuit of claim 7, wherein the counter is configured to multiply the counter value by a factor to produce a weighted counter value.

9. The circuit of claim 7, wherein the counter is configured to count events during a measurement period, and further comprising:
    a comparator configured to compare a new absolute path metric difference with the difference value, and when the new absolute path metric difference is smaller than the difference value to:
        set the difference value equal to the new absolute path metric difference; and
        reset the counter value to one.

10. The circuit of claim 8, wherein the counter is configured to count for different kinds of events thereby obtaining counter values for each kind of event, each kind of event being defined by a range of difference values, and wherein the calculation circuit is configured to estimate the bit error rate based on a sum of all weighted counter values.

11. The circuit of claim 7, and further comprising an applicator configured to apply a function to said one of said set of difference values that converts quantized log probabilities to probabilities thereby obtaining a function value, wherein the bit error rate is estimated based on said function value.

12. The circuit of claim 11, wherein the calculation circuit is configured to estimate the bit error rate based on said function value by dividing said function value by the sum of 1 plus said function value.

13. The circuit of claim 7, wherein the arithmetic circuit is further configured to compute quantized absolute path metric differences by skipping a predetermined number of predetermined symbol positions.

14. The method of claim 1, wherein the calculating quantized absolute path metric differences is performed by skipping a predetermined number of predetermined symbol positions.

* * * * *